United States Patent [19]

Thome

[11] Patent Number: 4,737,887
[45] Date of Patent: Apr. 12, 1988

[54] ELECTROSTATIC SPRAY DEVICE PROVIDED WITH ELECTRIC-ARC PROTECTION MEANS

[75] Inventor: Caryl Thome, Saint Egreve, France

[73] Assignee: Sames S.A., Meylan, France

[21] Appl. No.: 914,479

[22] Filed: Oct. 1, 1986

[30] Foreign Application Priority Data

Oct. 2, 1985 [FR] France .................. 85 14596

[51] Int. Cl.$^4$ .................. B05C 1/00; B05B 5/02
[52] U.S. Cl. .................. 361/228; 239/691
[58] Field of Search .................. 239/690, 691; 361/212, 361/215, 228

[56] References Cited

U.S. PATENT DOCUMENTS

| | | | |
|---|---|---|---|
| 3,764,883 | 10/1973 | Staad et al. | 321/11 |
| 3,795,839 | 3/1974 | Walberg | 361/228 |
| 4,009,829 | 3/1977 | Sickles | 361/228 X |
| 4,187,527 | 2/1980 | Bentley | 361/235 |
| 4,508,276 | 4/1985 | Malcolm | 239/691 |

FOREIGN PATENT DOCUMENTS

| | | |
|---|---|---|
| 0135424 | 3/1985 | European Pat. Off. . |
| 1601577 | 10/1970 | France . |
| 2397735 | 2/1979 | France . |
| 2551928 | 3/1985 | France . |
| 532859 | 2/1973 | Switzerland . |
| 1530479 | 11/1978 | United Kingdom . |

Primary Examiner—Donald A. Griffin
Attorney, Agent, or Firm—Sandler & Greenblum

[57] ABSTRACT

An electronic safety device to prevent electrical arcing in electrostatic sprayer apparatus for spraying material such as paint comprises a device for generating a very low voltage AC signal in a fixed supply and control unit and a voltage step-up device in a mobile sprayer. A device sensitive to variations in the alternating current flowing in the conductors linking the generating device to the step-up device is connected to a disabling device capable, for example, of blocking the generating device when too sudden a current variation is measured, since such a current variation may precede electrical arcing.

10 Claims, 1 Drawing Sheet

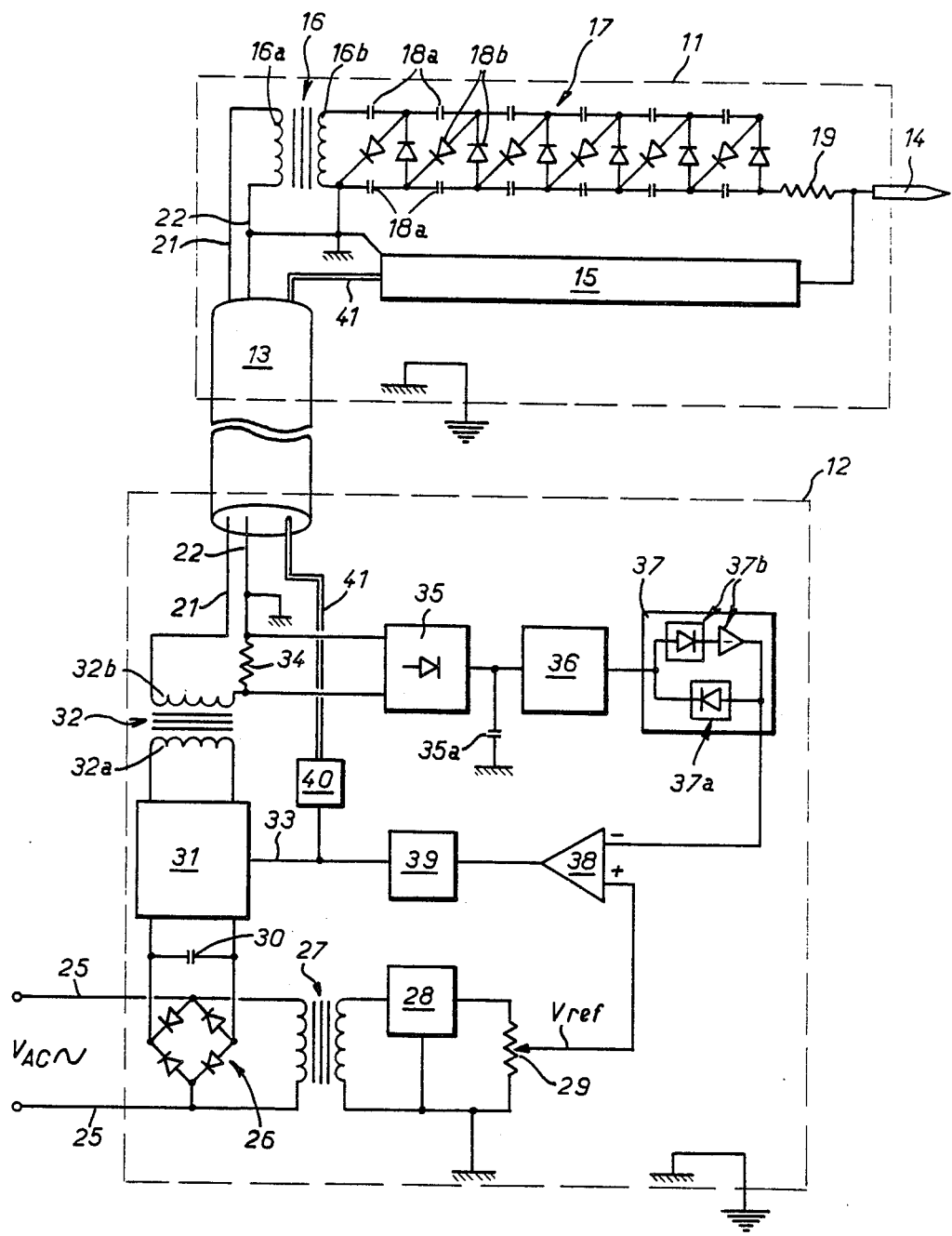

ELECTROSTATIC SPRAY DEVICE PROVIDED WITH ELECTRIC-ARC PROTECTION MEANS

BACKGROUND OF THE INVENTION

1. Field of the invention

The invention concerns electrostatic sprayer apparatus for spraying material such as paint, and more particularly an improvement for avoiding electrical arcing which can represent a real danger when the sprayed material contains volatile, inflammable substances.

2. Description of the prior art

Electrostatic sprayer apparatus comprises in particular a mobile sprayer equipped with a high voltage electrode, designed to create an electrical field between said electrode and the object to be sprayed (which is grounded) and to disperse the sprayed material. To achieve this, the sprayer apparatus comprises, in addition to the electrode, means of supplying the sprayed material with spraying energy (air) and electrical energy. The sprayer is therefore connected to a fixed supply and control unit by a supply line comprising electrical cables and other conduits. Electrical energy is almost always output by the sprayer in the form of a high DC voltage on the order of 50 to 150 kV, applied to the electrode. The resulting current, represented by the flow of charged particles and the atmospheric ions generated or attracted by the field, is on the order of 50 to 200 μA. A number of methods has been proposed for applying the high voltage to the sprayer electrode.

The high voltage may be applied directly to the electrode from a high voltage generator in the remotely sited supply and control unit, which therefore contains the converters for converting the electrical energy supplied by the AC distribution network into a high DC voltage. The supply line must then include a high voltage cable in an appropriately adapted insulating sheath.

The sprayer may also be supplied from a very low DC voltage (a few tens of volts) if the sprayer includes a cascade arrangement of a high frequency oscillator supplied from said very low DC voltage, a step-up transformer outputting a high frequency medium voltage (on the order of a few kV) and a conventional capacitor/diode voltage rectifier-multiplier assembly transforming the high frequency medium voltage into a high DC voltage, which is then applied to the electrode. In this case, the supply and control unit contains only a step-down transformer and a rectifier to transform the low AC voltage of the distribution network into a very low DC voltage. The said supply line includes conductors (without strengthened insulation) carrying this direct current to the oscillator.

Another proposed solution is to locate only the transformer and voltage rectifier-multiplier assembly in the sprayer. The oscillator is then remotely located in the supply and control unit. In this case, the supply line carries a very low voltage, high frequency AC signal. The invention to be described applies preferably to such an arrangement although its principle may be applied to any system comprising DC/high frequency AC conversion.

Electrical arcing observed in operation may result from a number of causes.

Whatever device is used, it may arise that the distance between the high voltage electrode of the sprayer and the grounded object to be sprayed becomes insufficient to support the value of the high DC voltage.

If the high voltage is generated at a location remote from the sprayer, an insulation fault in the high voltage cable may also be a cause of electrical arcing.

However, if the high voltage is generated in the sprayer, the supply line carries a relatively high current (a few amps) and an interruption in the cable or a poor connection contact is likely to cause an electrical arc because of the energy stored in the inductance of the circuit.

Various systems have been proposed to combat electrical arcing. These known systems are classified according to the type of electrical arc that it is wished to eliminate.

Thus, it is known that arcing can be prevented by monitoring the DC current of the voltage rectifier-multiplier assembly, generally at the point of its return to the power supply. Electrical arcing involves a sudden increase in current in this cirucit and this increase in current may be used by electronic means to act on the high voltage generation means. Such a device is described for example in French Pat. No. 2397735. The disadvantage of many devices of this type is that any failure in the monitoring means (in series with the high voltage supply) generates interference likely to cause the destruction of certain components of the power supply. If the ground connection of the voltage rectifier-multiplier is interrupted, a substantial increase in voltage occurs on the corresponding terminal of the high voltage supply, this increase in voltage being dangerous for the components. In addition, the return current is often used as a negative feedback signal to regulate the power supply, a reduction in current being used in a control device to implement an increase in the high voltage. Consequently, a failure in the monitoring means may bring about an undesirable increase in the high voltage. These risks are substantially greater in devices in which the high voltage generation means are incorporated in the sprayer since the current return conductor passes into the supply line and is therefore more vulnerable by virtue of its length. Also, the monitored current is not strictly speaking direct, but rather a "unidirectional ripple" current and it includes an AC component linked to the spurious capacitances of the voltage multiplier, this AC component being superimposed on the DC component. Consequently, any means of detecting the increase in this current must include effective filtering to avoid the edge of the AC component being "interpreted" by the monitoring circuits as an increase in current. The need for such filtering often involves poor response time of the monitoring circuit, which is therefore always very complex and consequently expensive and fragile.

It has consequently been proposed to control the rapid changes in high voltage which precede electrical arcing by using a capacitive divider. This principle is described in French Pat. No. 1601577. This solution is particularly effective when arcing is more particularly due to a reduction in the distance between the high voltage electrode and the object to be sprayed.

Finally, a method is known of monitoring the low voltage direct current when the sprayer is supplied by this low voltage (that is when it contains the oscillator and rectifier-multiplier) by comparing this current with a reference value. Such a device is for example described in French Pat. No. 2 551 928. The only function of the monitoring means is to monitor the continuity of the circuit in order to react to a sudden fall in the oscillator supply current. The monitoring means can therefore detect only this type of fault and do not eliminate the need to use a monitoring circuit for the high voltage itself, similar to one of those described above, with the aforementioned disadvantages.

SUMMARY OF THE INVENTION

The invention consists in a more effective, less expensive solution, capable of detecting a number of operating troubles preceding electrical arcing, designed so that accidental outage of the monitoring means does not entail damage to other components.

The invention consists more particularly in electrostatic sprayer apparatus comprising means of generating a low voltage AC signal supplying voltage step-up means, means sensitive to variations in the alternating current flowing between said generating means and said step-up means and means of disabling said generating means, controlled by said means sensitive to current variations.

In this way, a "positive" variation in the current value, most frequently resulting from the high voltage electrode coming closer to the object to be sprayed, will trigger the generation of a disabling signal preferably blocking the oscillator, whilst a sudden "negative" variation will generally indicate a rupture or faulty contact in the supply line and will give rise to the same result. Taking into account the fact that monitoring is effected by measuring the current output by the oscillator, the invention applies more advantageously to apparatus in which the step-up transformer and voltage multiplier are located in the sprayer and are supplied at a high frequency, very low voltage by the oscillator in the supply and control unit linked by a supply line to the sprayer. The detection means may thus be located in said unit, at the same time effectively "supervising" the state of the supply line. In addition, these detection means are less exposed because they are located in the control unit and even their failure will be able to cause only a blockage of the oscillator, entailing the apparatus being powered down.

Other objects and advantages will appear from the following description of a currently preferred embodiment of the invention, when considered in connection with the accompanying drawing, and the novel features will be particularly pointed out in the appended claims.

BRIEF DESCRIPTION OF THE DRAWING

The FIGURE is a schematic representation showing an electronic high voltage supply circuit for an electrostatic sprayer electrode.

DESCRIPTION OF THE PREFERRED EMBODIMENT

The embodiment shown in the figure comprises a mobile sprayer 11 and a remotely located fixed supply and control unit 12 connected to the sprayer by a set of electrical conductors and other conduits combined in a single line 13, although this arrangement is in no way essential. Only the structural elements needed to understand the invention are shown in the figure. Other conventional elements such as the means for feeding the sprayed material and the air supply are not shown. The sprayer is equipped with an electrode 14 located so as to charge the jet of sprayed material ejected towards the object to be sprayed. The electrical part of the sprayer 11 essentially comprises a high frequency, medium voltage, step-up transformer 16, the secondary winding 16b of which is connected to a conventional voltage rectifier-step-up assembly 17 incorporating capacitors 18a and diodes 18b. The high volage output of this assembly is connected to electrode 14 via a reducing resistor 19. The "foot" of the secondary winding 16b is connected to the frame of the sprayer 11 and, since the sprayer is a mobile assembly, via a conductor 22 of the supply line 13, to the ground circuit of the unit 12, the frames of the sprayer 11 and the unit 12 being grounded, as shown clearly on the figure. The sprayer 11 also houses means 15 of grounding the output of said voltage step-up means, connected to the electrode 14, here pneumatically controlled, and electrically interconnected between said electrode 14 and the frame of the sprayer, that is ground; these grounding means will be described further on. The two terminals of the primary winding **16*a* of the high frequency transformer 16 are connected by two conductors 21, 22 respectively, to the supply and control unit 12. The supply and control unit is connected to the AC distribution network $V_{AC}$ by two conductors 25 supplying a diode rectifier bridge 26 and the primary winding of an auxiliary transformer 27. The secondary winding of this transformer is connected to an integrated circuit 28 forming a stabilized power supply and a potentiometer 29 connected to the output of this circuit provides a means of obtaining an adjustable reference voltage Vref, which is available on the cursor of said potentiometer. The voltage rectified by the rectifier bridge 26 is filtered by a capacitor 30 and supplies a high frequency chopper-oscillator 31 including at its output the primary winding 32*a* of a voltage step-down, isolating transformer 32. The chopper-oscillator 31 in this embodiment is of a known type incorporating an integrated circuit and transistors. It can therefore be easily blocked by applying a suitable signal to a corresponding control input. The figure shows such an input 33 to which this blocking signal may be applied. Such chopper-oscillators are commercially available. The two conductors 21, 22 are connected to respective terminals of the secondary winding 32*b* of the step-down transformer 32. The assembly comprising the chopper-oscillator 31 and the transformer 32 are only one possible embodiment of a means of generating a very low voltage, relatively high frequency AC signal, which supplies voltage step-up means located in the sprayer 11, and consisting, as already described, of the step-up transformer 16 and the voltage rectifier-step-up assembly 17. Other known devices may be used instead of the chopper-oscillator 31, notably any type of oscillator or inverter using transistors or thyristors capable of delivering the required power. The invention also provides for means 34, 35, 36, 37 and 38 sensitive to variations in the alternating current flowing in conductors 21 and 22 connecting the means 31, 32 of generating an AC signal and the voltage step-up means 16, 17, as well as means 39 of disabling said generating means, controlled by said means sensitive to current variations. Disabling means are any arrangement capable of preventing the application of a periodic signal to the primary winding of the transformer 16. For this reason the disabling means 39 are most frequently a bistable thyristor relay or even a single thyristor connected to the blocking input 33, the connection of this subassembly being within reach of the craftsman. However, other means may be conceived of preventing a periodic signal being applied to the transformer 16, such as for example an electronic or electromagnetic cut-out connected to isolate the chopper-oscillator from the rectifier bridge 26 or a cut-out located in the unit 12** and connected to isolate the conductors 21 and 22 from the transformer 32. The means sensitive to alternating current variations comprise a cascade arrangement of means sensitive to said current 34, 35 coupled to the circuit linking the transformers 32 and 16, differentiating means 36, rectifier—level adapter means 37 and a comparator 38 the output of which controls the disabling means 39. The means sensitive to current outputs to the said differentiating means a DC voltage representative of the current flowing in the conductors 22. To achieve this it comprises a simple resistor 34 inserted in series in this conductor and a rectifier circuit 35 connected to the terminals of the resistor, the output voltage of which, filtered by a capacitor 35a is applied to the input of the differentiating means 36. The capacitor 35a is of relatively low value which is possible because the measured alternating current is of relatively high frequency in order not to "over-reduce" the variations in voltage applied to the input of the differentiating means 36. The capacitor 35a is of relatively low value, which is possible because the alternating current measured is of relatively high frequency, to avoid "over-reducing" the variations in voltage applied to the input of the differentiating means 36. The differentiating means 36 therefore outputs positive or negative pulses according to the direction of variation of current in the resistor 34. Negative pulses are applied unchanged to one input of the comparator 38 via a first leg 37a, similar to a diode, of said rectifier—level adapter means while positive pulses are applied to this same input via a second leg 37b, in parallel with the first. This second leg is similar to a cascade arrangement of a diode and an amplifier-polarity inverter, the diode being reverse connected with respect to leg 37a. The invention clearly covers all possibly technical equivalents of the means 37 performing a similar function. With this arrangement, the positive pulses are inverted and amplified before being applied to the input of the comparator 38. The other input of this comparator 38 is connected to the cursor of the potentiometer 29 and therefore receives the reference voltage Vref. Any positive or negative pulse generated by the differentiating means can therefore activate the disabling means 39, through the effect of a signal output by the comparator 38, provided that the pulse is of sufficient amplitude. However, because of the amplification given to the positive pulses applied via leg 37b, the disabling means 39 will be able to operate under the effect of an increase in current in the resistor 34, slower than the reduction in current necessary to obtain the same activation. This is justified by the nature of faults which cause variations in current in the resistor 34 and the conductor 22. If an increase in current occurs due for example to the electrode 14 coming close to the object to be sprayed, this variation in current is much slower than the variation, negative since it is a reduction, which can result, for example, from a rupture of the link between the transformer 32 and 16. The amplitude of a positive pulse generated by the differentiating means 36 is therefore up to one million times lower than the amplitude of a negative pulse. The rectifier--level adapter means 37 are used in all circumstances to control operation of the disabling means 39. The disabling means 39 also control a solenoid 40 which, via a pneumatic conduit 41 controls the grounding means 15. The grounding means 15, according to the embodiment shown, are in accordance with the device described in French Pat. No. 2550882 in the name of the Applicant. Other types of grounding device may also be used, for example that marketed by the American KILOVAC-CORPORATION under reference KC6(NC), the pneumatic conduit 41 in this case being replaced by an electric control link.

Thus, as soon as an excess variation in current, positive or negative, occurs in the resistor 34 the electronic means just described react to block the chopper oscillator 31 and to ground the electrode 14, which results in the power supply to the voltage step-up means being cut-off and the rectifier—voltage step-up means 17 being discharged, before the first electric arc appears. It is also noteworthy that accidental grounding of the conductor 21, particularly in the supply line 13, can also be detected through the resulting increase in current in the resistor 34 which is then directly connected between the terminals of the secondary 32b.

We claim:

1. Electrostatic sprayer apparatus comprising means for generating a low voltage AC signal and means for stepping up said voltage of said Ac signal, means for sensing variations in the alternating current flowing between said generating means and said stepping up means, and means for disabling said generating means, said disabling means being controlled by said means for sensing current variations.

2. Apparatus according to claim 1, wherein said means for sensing variations in the alternating current comprise means for sensing said current coupled to a circuit linking said signal generating means to said stepping up means, means for generating a signal representative of the value of said current, and differentiating means connected to said current sensing means, said differentiating means comprising means for receiving said representative signal.

3. Apparatus according to claim 2, further comprising rectifying means connected to an output of said differentiating means and a comparator, said comparator including a first input which is connected to an output of said rectifying means and a second input which is linked to means for generating a reference voltage.

4. Apparatus according to claim 3, wherein said rectifying means comprise rectifier-level adapter means including two legs connected in parallel, said legs respectively transmitting positive and negative pulses from said differentiating means at different rates of amplification.

5. Apparatus according to claim 4, wherein said means for sensing said current comprises a resistor inserted in series in a conductor linking said AC signal generating means to said stepping up means, and a rectifier circuit connected to terminals of said resistor.

6. Apparatus according to claim 3, wherein said means for sensing said current comprise a resistor inserted in series in a conductor for linking said AC signal generating means to said stepping up means, and a rectifier circuit connected to terminals of said resistor.

7. Apparatus according to claim 1, wherein said disabling means are linked to a blocking input of a chopper-oscillator or similar device in said AC signal generating means.

8. Apparatus according to claim 1, wherein said disabling means are connected to means for controlling grounding of the output of said means for stepping up said AC signal voltage.

9. An electrostatic sprayer apparatus comprising means for generating a low voltage AC signal and means for stepping up said voltage of said AC signal, means for sensing variations in the alternating current flowing between said generating means and said stepping up means, and means for disabling said generating means, said disabling means being controlled by said means for sensing current variations, wherein said means for sensing variations in the alternating current comprise means for sensing said current coupled to a circuit linking said generating means to said stepping up means, means for generating a signal representative of the value of said current, and differentiating means connected to said current sensing means for receiving said representative signal, and further comprising rectifying means connected to an output of said differentiating means and a comparator, said comparator including a first input which is connected to an output of said rectifying means and a second input which is linked to means of generating a reference voltage, wherein said rectifying means comprise rectifier-level adaptor means including two legs connected in parallel, said legs respectively transmitting positive and negative pulses from said differentiating means at different rates of amplification.

10. Electrostatic sprayer apparatus comprising means for generating a low voltage AC signal and means for stepping up said AC signal voltage, said AC signal generating means supplying voltage through at least one long electric cable from a base unit to a mobile unit in which said stepping up means is located, said apparatus further comprising means for sensing variations in alternating current flowing in said long electric cables between said generating means and said stepping up means, and further comprising means for disabling said generating means, said disabling means being controlled by said means for sensing said current variations, said sensing means being located in said base unit.

* * * * *